United States Patent [19]

Liang

[11] Patent Number: 5,586,344
[45] Date of Patent: Dec. 24, 1996

[54] PORTABLE TOILET

[76] Inventor: Tui-Chang Liang, No. 126, Sec. 1, Kuang Fu Road, San Chung City, Taiwan

[21] Appl. No.: 489,813

[22] Filed: Jun. 13, 1995

[51] Int. Cl.⁶ ........................................... A47K 11/02
[52] U.S. Cl. ........................................... 4/484; 4/476
[58] Field of Search .................... 4/449, 458–460, 4/476, 479, 483, 484

[56] References Cited

U.S. PATENT DOCUMENTS

| | | | |
|---|---|---|---|
| 1,575,131 | 3/1926 | Schumacher | 4/460 |
| 2,431,538 | 11/1947 | Brief et al. | 4/476 |
| 3,063,061 | 11/1962 | Bertram | 4/484 |
| 3,203,007 | 8/1965 | Olson | 4/484 |
| 3,950,794 | 4/1976 | Dalton | 4/484 |
| 5,029,348 | 7/1991 | Boren | 4/460 X |

FOREIGN PATENT DOCUMENTS 0073633  11/1953  Netherlands ............... 4/483

*Primary Examiner*—Charles E. Phillips

[57] ABSTRACT

A portable toilet which can be readily assembled and disassembled, including a base, a bowl detachably connected to the base, and an upper frame detachably connected to the base by two suspension tubes. The portable toilet can be used in a car or in the fields, or wherever it is needed.

4 Claims, 8 Drawing Sheets

PORTABLE TOILET

FIELD OF THE INVENTION

The present invention relates generally to a portable toilet and in particular to a light weight, easy to be assembled and disassembled toilet which can be used both on vehicles or in the field.

BACKGROUND OF THE INVENTION

When people are traveling by car or are camping in the fields, they usually have trouble finding an accessible toilet facility.

To solve such a problem, a temporary toilet is then build in places where they are most needed. However, because these temporary toilets are generally build with fiber glass or wooden boards and usually include a box-like container to store the waste, they generally occupy a large space and are not suitable for a vehicle, except possibly a trailer.

SUMMARY OF THE INVENTION

An object of the present invention is to provide a portable toilet which can be used both in cars and in the field. The portable toilet of the present invention is light weight and easy to be assembled and disassembled, is low in cost and is effective in solving the problem of having a readily available toilet.

Another objective of the present invention is to provide a set of metal frames which can be assembled to become a temporary toilet. After being assembled, a cloth cover is then used to cover the assembled metal frame. This will not only maintain personal privacy, but also provide a private environment.

Still, another objective of the present invention is to provide a portable toilet which, when not in use, can be easily disassembled and stored in a bag or trunk.

Another objective of the present invention is to provide a bowl which allows for the ready disposal of waste. The bowl is designed with a hook on each side thereof to suspend the waste bag while the waste bag is disposed with the bowl.

According to the present invention, the foregoing and other objectives and advantages are attained by the portable toilet of the present invention comprising a base which includes two tubular side members connected traversely by two horizontal tubes. An insert tube is pivotably connected to each of the two tubular side members so that each insert tube is capable of an approximately 90 degree displacement relative to a tubular side member. A bowl having a seat and a container which is integral with the seat is also part of the portable toilet. The seat has a bottom with a front, rear, left side and right side. A recessed member is disposed at the front and rear of the seat bottom to receive and to mate with the two horizontal tubes of the base. Hooks are disposed at each of the left and right sides of the seat bottom and are adapted to have a waste bag suspended therefrom. The portable toilet also includes an upper frame and two suspension tubes. The upper frame includes two generally n-shaped tubes which are pivotably connected to each other at their ends and are thereby capable of being pivotably disposed by approximately 180 degrees to each other. One of the generally n-shaped tubes has two spaced-apart bent members extending therefrom and an insert tube extending from each of the two bent members. The two suspension tubes have a diameter that is larger than the diameters of the insert tubes of both the base and upper frame. Each of these suspension tubes has opposite ends, with one end of each suspension tube mating with an insert tube of the base, and an opposite end of each suspension tube mating with an insert tube of the upper frame, thereby connecting the upper frame to the base.

Other features and advantages of the present invention will become apparent from the following description of the invention which refers to the accompanying drawings.

BRIEF DESCRIPTION OF THE DRAWING

The present invention will be better understood from the following description of preferred embodiments of the present invention, with reference to the attached drawings, wherein.

DETAILED DESCRIPTION OF THE PREFERRED EMBODIMENTS

Figure 1:
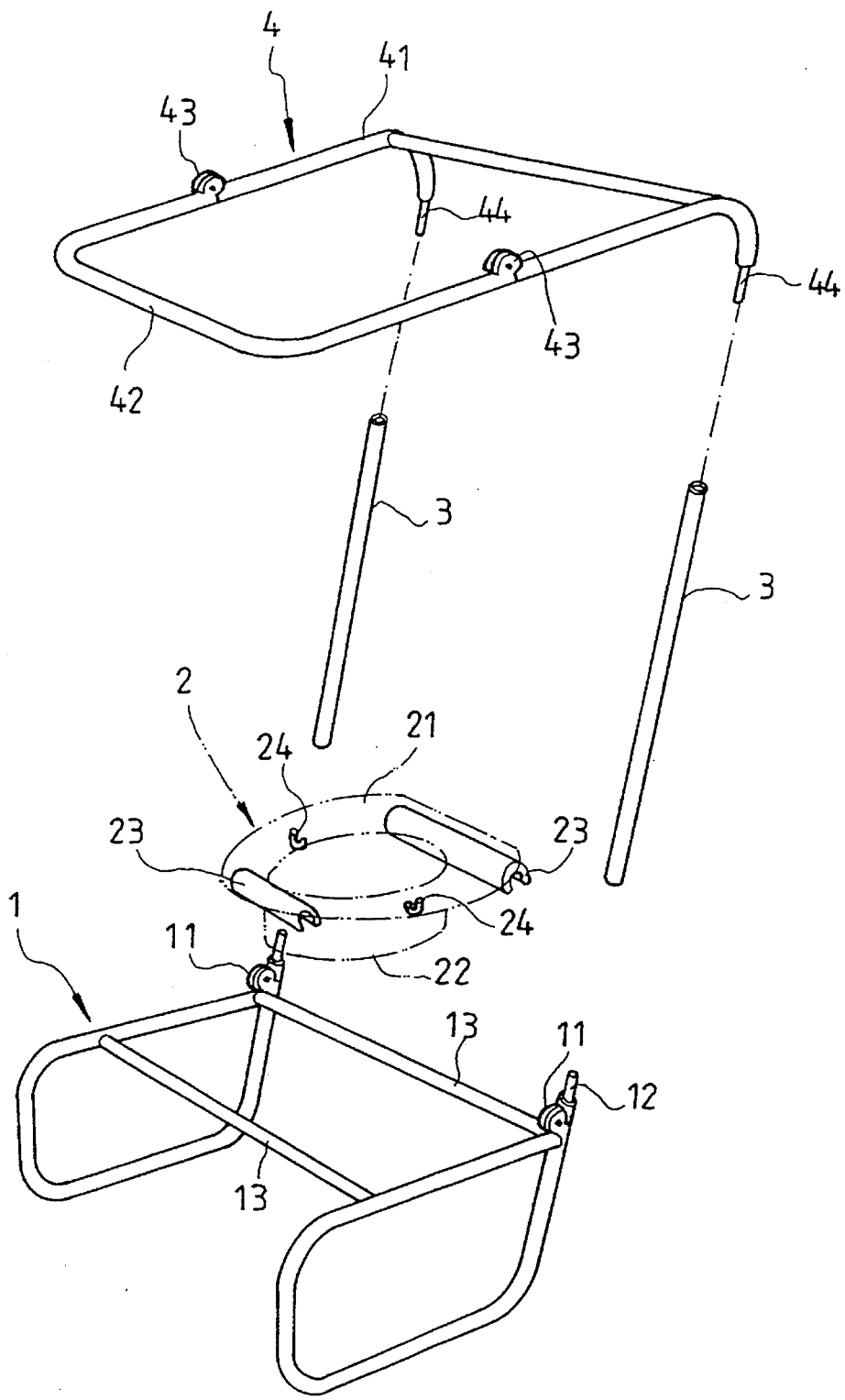
FIG. 1 is an exploded view according to the present invention.

With reference to the drawings and in particular FIGS. 1–8, wherein the bowl constructed in accordance with the present invention, is generally designated with the reference numeral 2. The portable toilet constructed according to the present invention comprises a base 1, a bowl 2, suspension tubes 3 and an upper frame 4. All these elements are made of round metal tubes. The two ends of the sides of base 1 are formed into a bending part 11. An upwardly extending slender insert tube 12 is designed to receive the suspension tube 3, and is capable of being bent 90 degrees for storing the portable toilet. Two horizontal tubes 13 are disposed on the two sides of the base 1, and therebetween, a moderate distance is allowed to separate each horizontal tube 13 from the other. The two horizontal tubes 13 are designed to receive the bowl 2, and to connect the sides of the base 1.

The bowl 2 is formed with a seat 21, and thereunder is formed a container 22. The front and rear bottom of the seat 21 has two recess members 23 integrally formed therewith and downwardly extending. The distance between the two recess members 23 is the same as the distance between the two horizontal tube 13. When assembled, the bowl 2 is fixed on the base 1 by mating the two horizontal tubes 13 and the members 23. The bottom right and left sides of the seat 21 have inwardly bent hooks 24 to suspend a waste bag.

The upper frame 4 is composed of two n-shape tubes 41, 42 and a bending part 43 is formed therebetween, which is for the purpose of allowing the n-shaped tube 42 to be pivoted approximately 180 degrees so the n-shaped tubes 41, 42 form a square like structure. The ends of n-shape tube 41 are bent downward and extending therefrom are insert tubes 44 which are symmetrically identical to the insert tubes 12 of the base 1.

Figure 2:
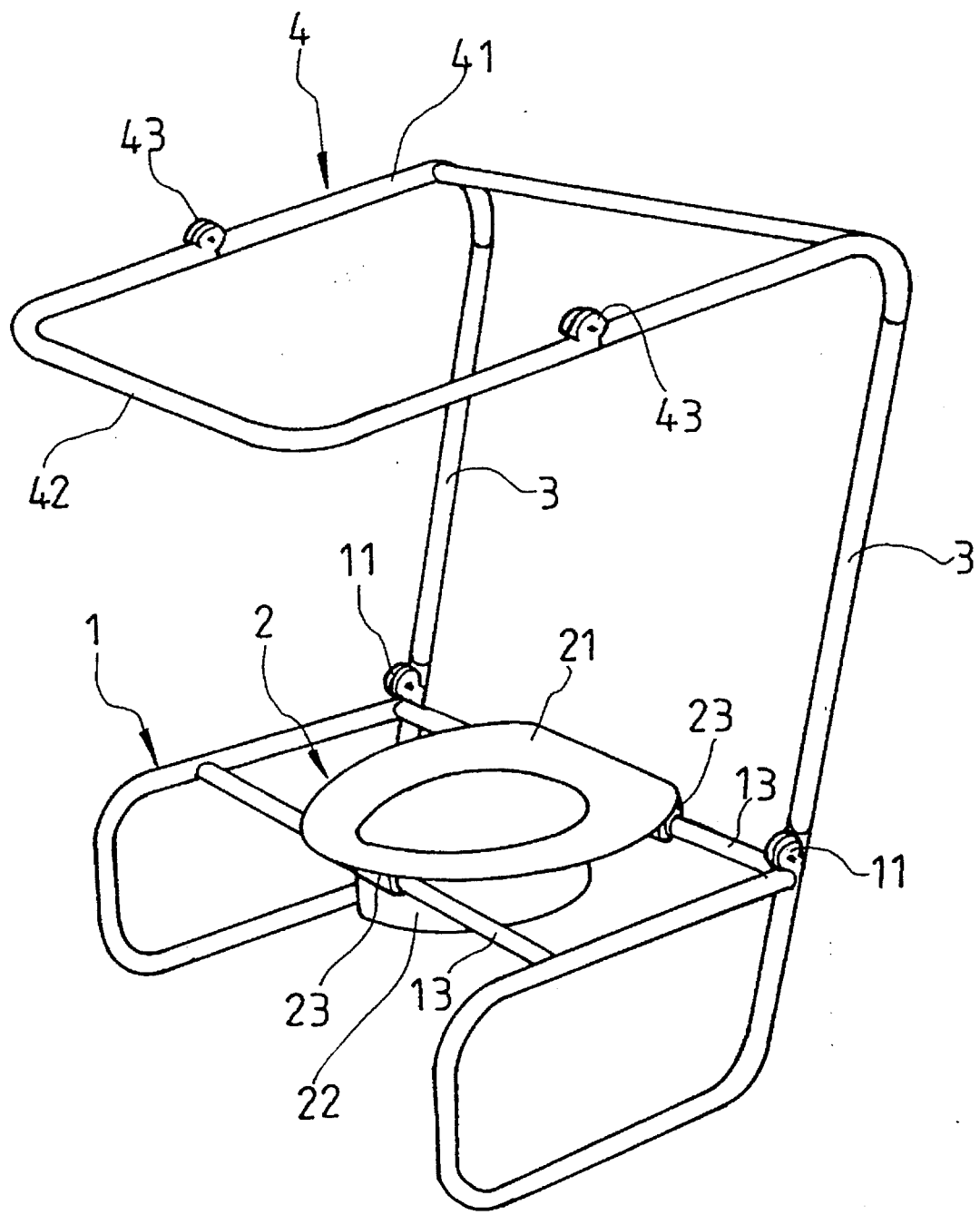
FIG. 2 is a perspective view of the present invention.

The diameter of the suspension tube 3 is bigger than the diameters of the insert tubes 12, 44 of the base 1 and the upper frame 4, respectively. Inserting one end of the suspension tube 3 to the insert tube 12 of the base 1, and the other to the insert tube 44 of the upper frame 4 provides the portable toilet of the present invention with a sufficient height as shown in FIG. 2.

Figure 3:
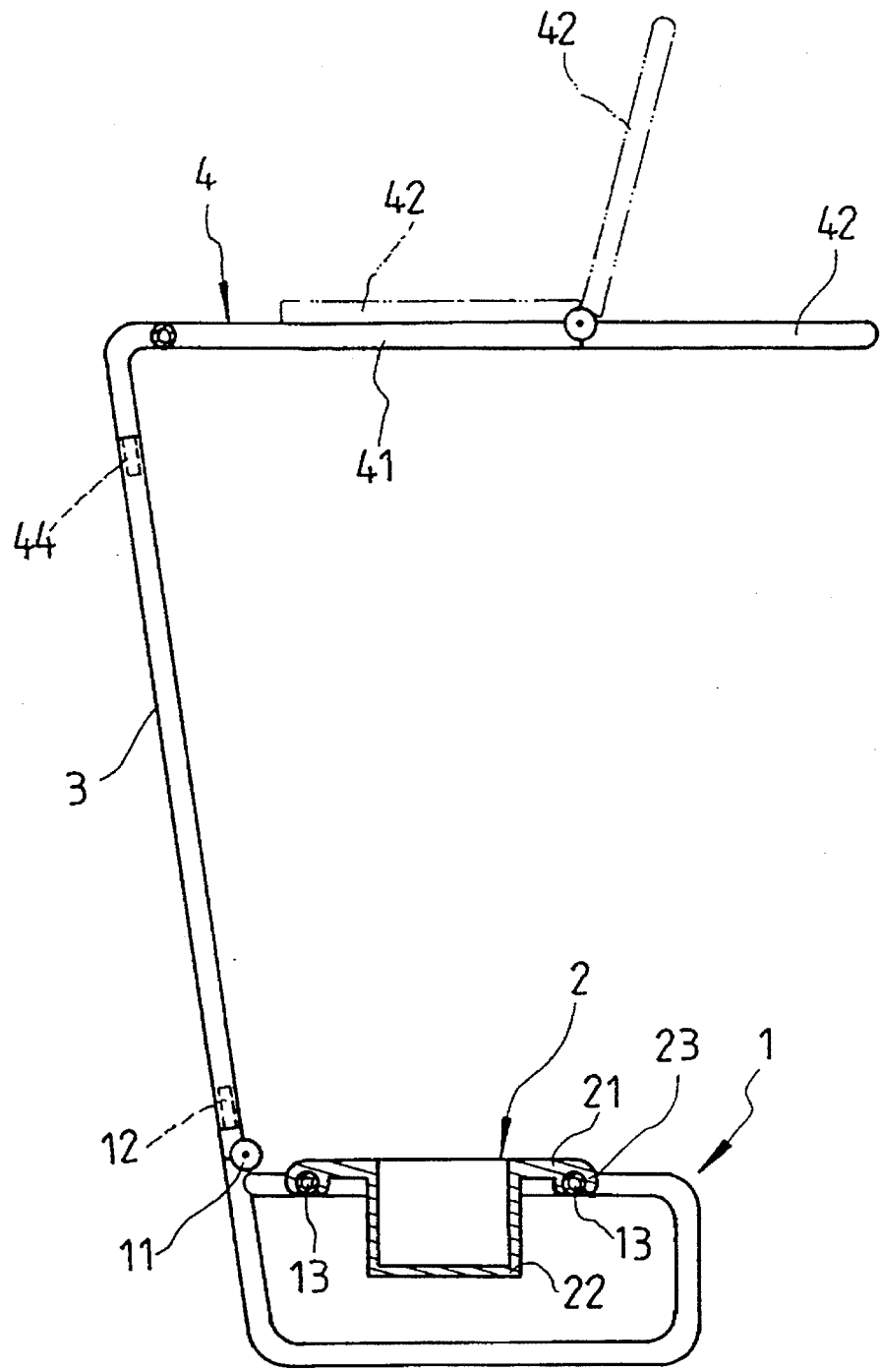
FIG. 3 is a side view of the present invention of FIG. 2 showing where the movable elements are formed in the frame.

The side view of the present invention, as shown in FIG. 3, shows that the length of the upper frame 4 is longer than the length of the base 1, and the base 1 is tilted outwardly at an angle, so as to increase the inner space of the portable toilet of the present invention, and readily accommodate the user. FIG. 3 also shows that the bending part 43 of the upper frame 4 is formed to allow the n-shape tube 42 to bend 180 degrees to either the right or to the left. When the portable toilet is stored, the n-shaped tubes 41 and 42 are folded together to reduce space.

Figure 4:
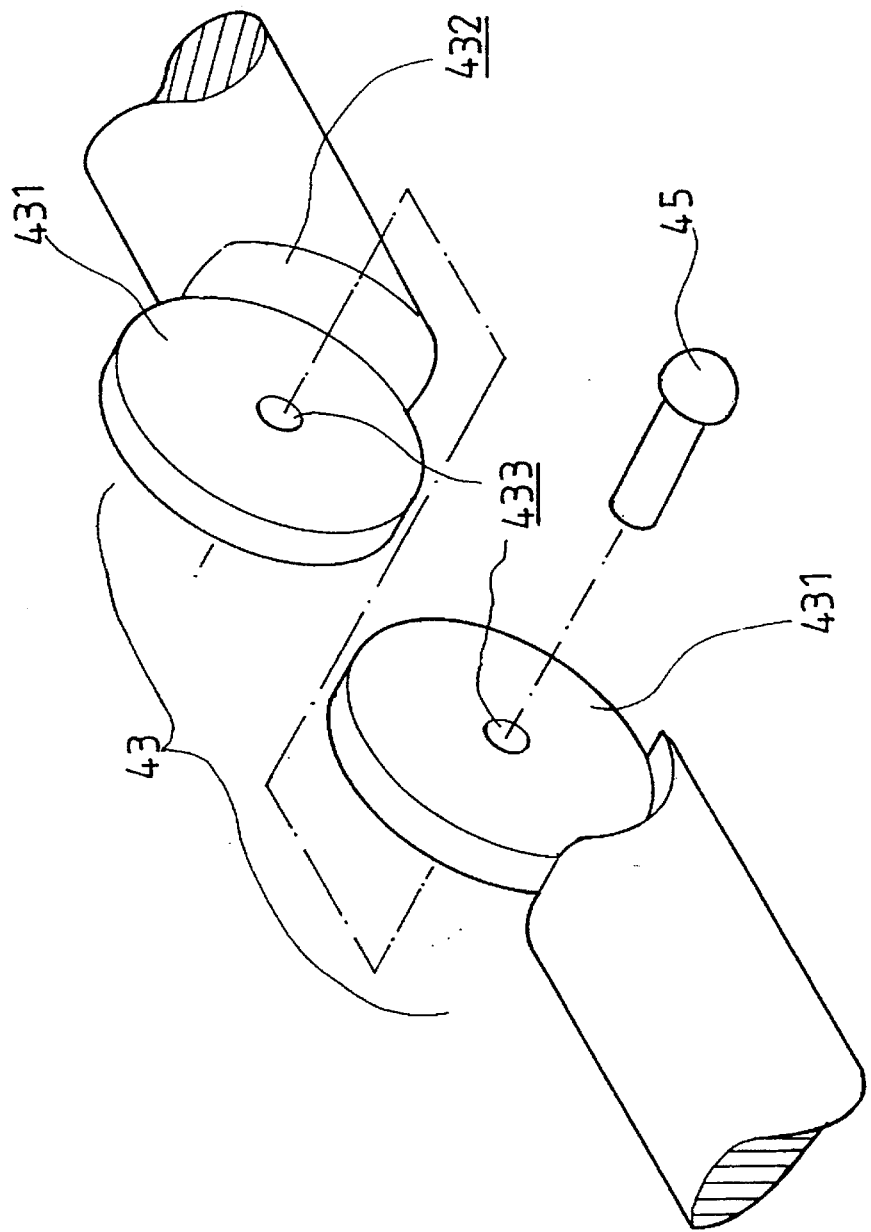
FIG. 4 is an exploded view of the movable elements of FIG. 3.
Figure 5:
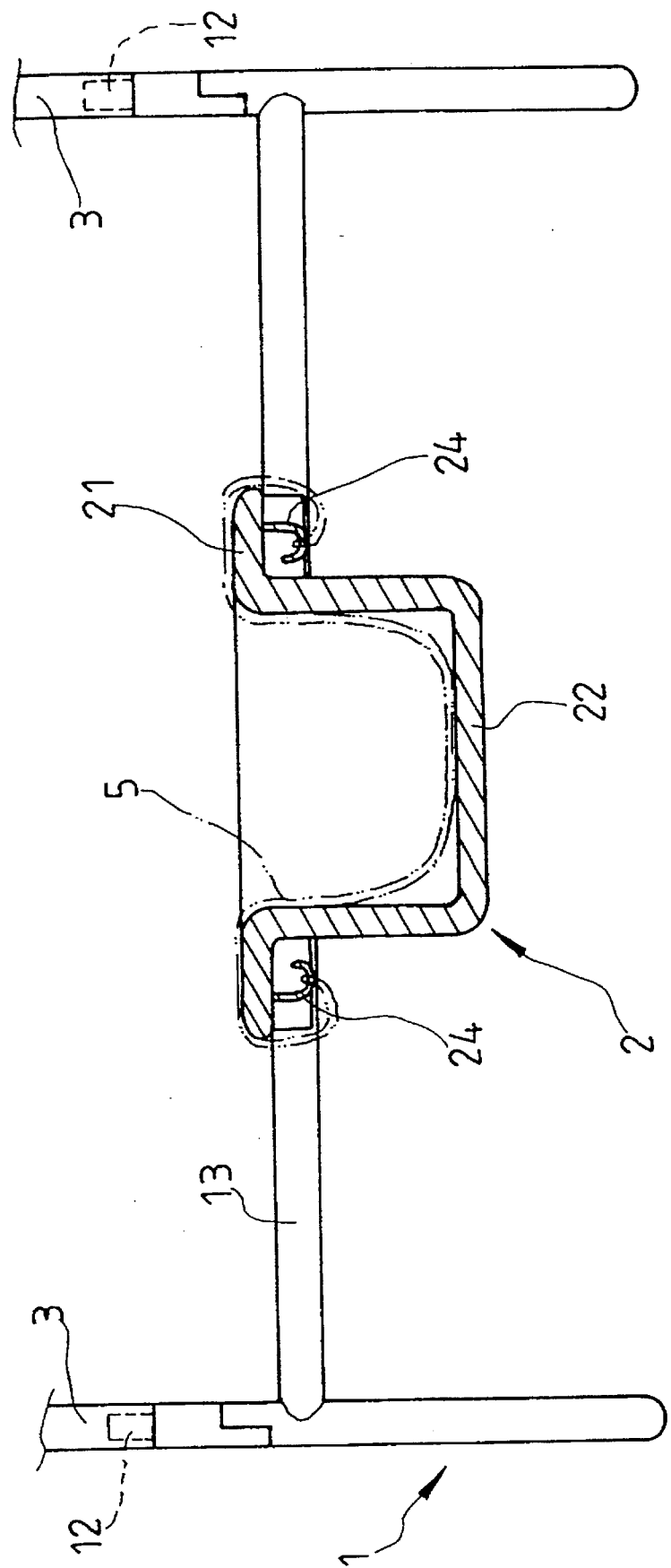
FIG. 5 is an embodiment of the portable toilet having a waste bag hooked on each side of the container.

Referring to FIG. 4, the bending part 43 (e.g., at the upper frame 4) is formed at the ends of the n-shaped tubes, and includes a rounded connecting means 431 at each end. Adjacent each rounded connecting means 431 is a concave surface 432 having the same arc as the rounded connecting means 431. The rounded connecting means 431 of one n-shaped tube mates with the rounded connecting means 431 of the other n-shaped tube, and are secured together with a screw 45 through a hole 433. After the two n-shaped tubes 41, 42 are secured together, they can be pivotably disposed relative to each other. When the front sides of the concave surfaces 432 of the two n-shaped tubes meet together, the two n-shaped tubes are parallel to one another (as shown by the dotted lines in FIG. 3).

When placing a waste bag 5 in the bowl 2, one first stretches out the waste bag 5, and then places the waste bag 5 in the container 22 and makes sure that the rim of the waste bag 5 is over the seat 21 and is hooked by the hooks 24 formed on the right and left sides of the seat 21. This will then hold the waste and will not let it fall out. If the waste bag 5 is loaded with waste, one just simply removes the waste bag 5 and conveniently replaces it with a new one and the portable toilet will then again be ready to use.

Figure 6:
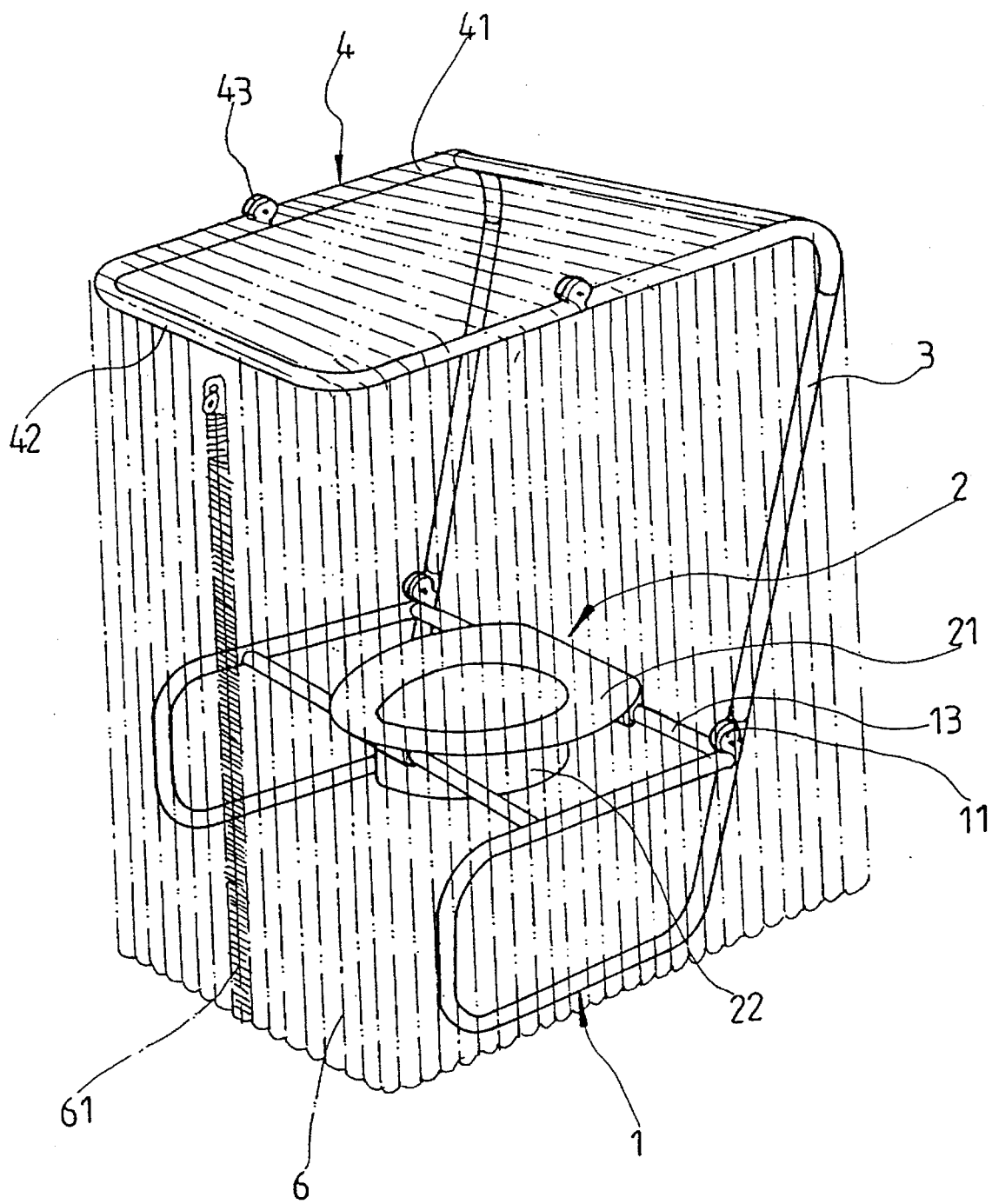
FIG. 6 is another embodiment of the present invention.

Referring to FIG. 6, a cloth cover 6 is provided to cover from the top of the upper frame 4 and because of the metal tubes, the cloth cover 6 will cover all over the space of the portable toilet to provide a perfect shelter for the user. A zipper 61 is provided at the center of the cloth cover 6 from top to bottom to allow people to enter the portable toilet more conveniently.

Figure 7:
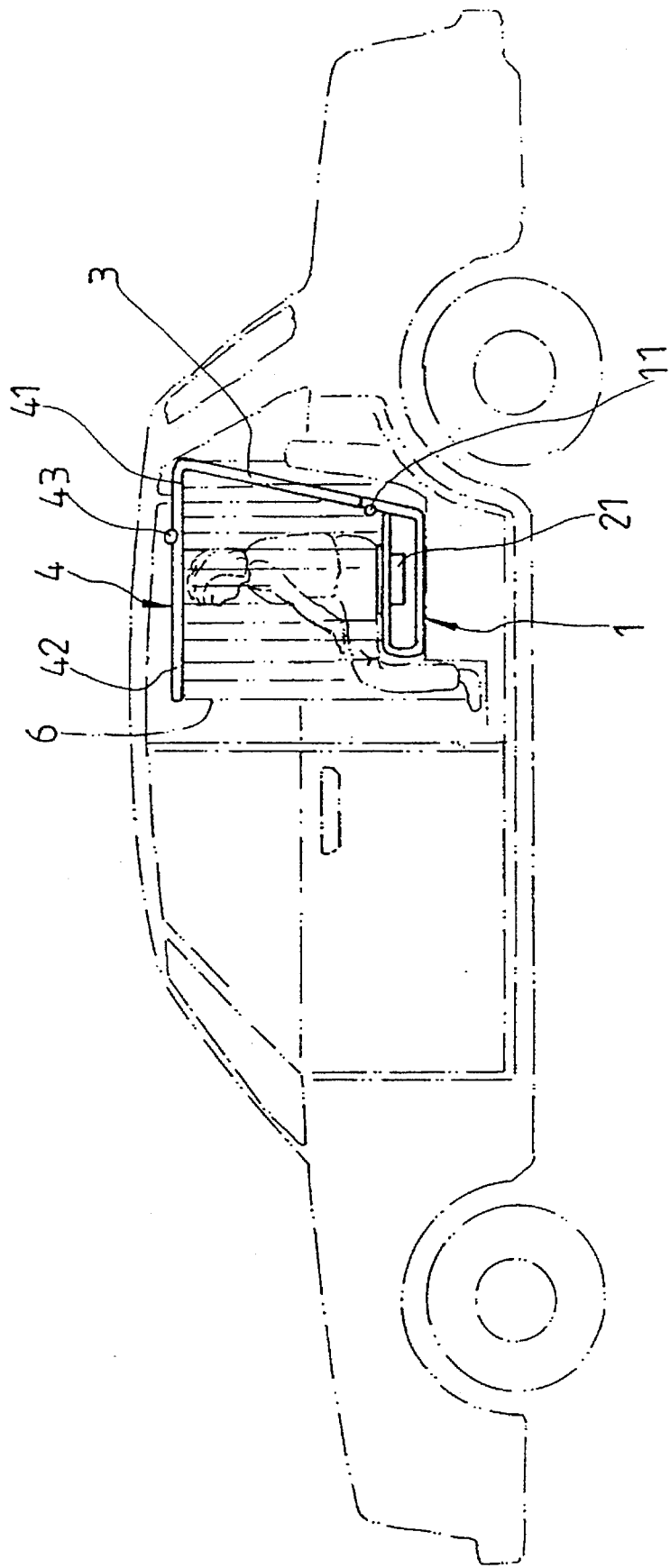
FIG. 7 is a further embodiment of the present invention which is installed in a car.

As shown in FIG. 7, when a toilet facility is required while driving in a car, a person can put all the parts of the portable toilet together on the back seat of a car and after using the toilet, he just removes the loaded waste bag 5 and disassembles the frame of the portable toilet. This will not only solve the problem of the difficulties of finding a toilet facility, but also avoids pollution to the environment.

Figure 8:
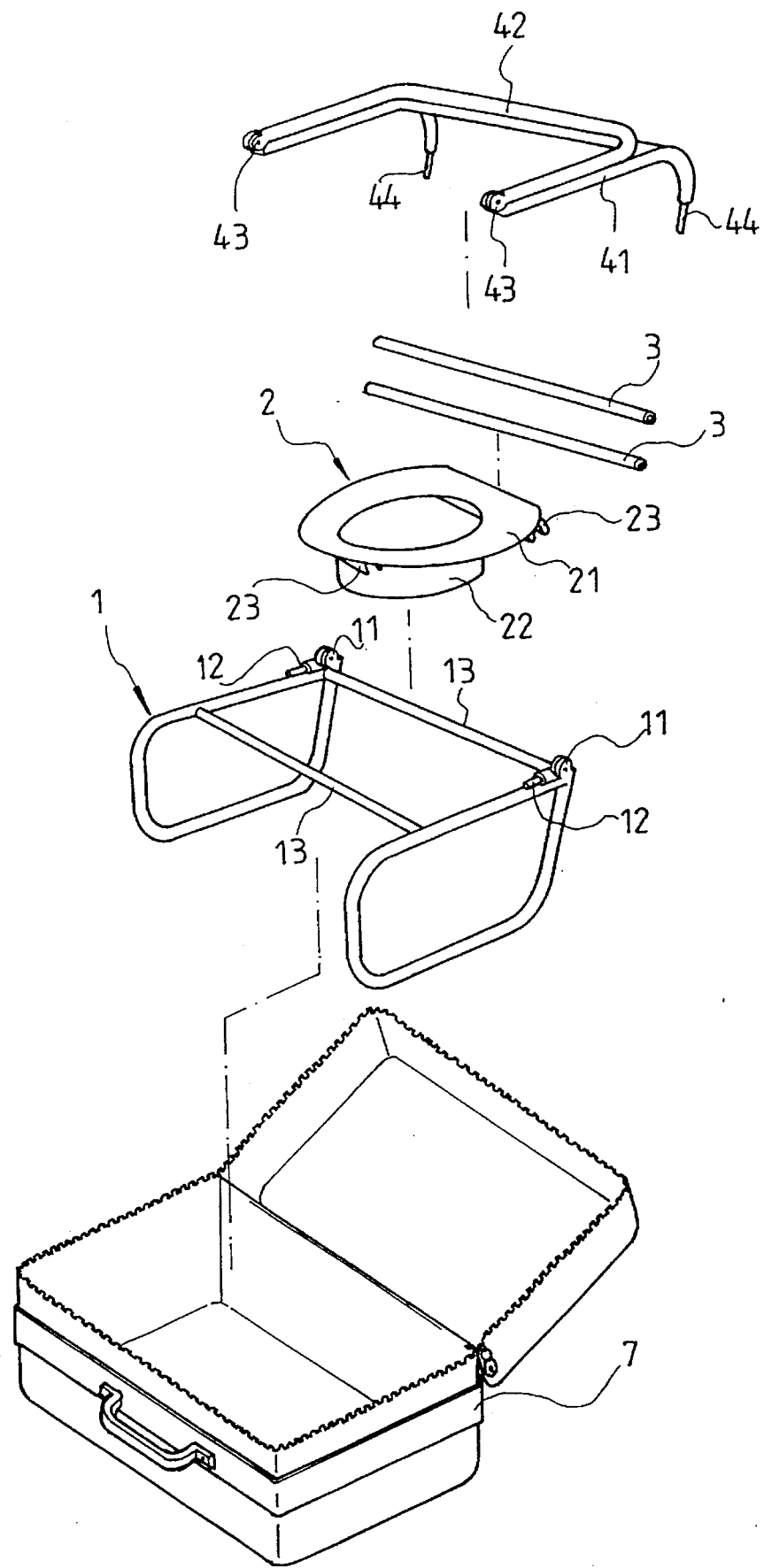
FIG. 8 is a view of the present invention showing how the disassembled parts are stored in a container.

Referring to FIG. 8, the portable toilet is shown being disassembled. When the portable toilet is being disassembled, one first turns the n-shaped tube 42 about 180 degrees toward the n-shaped tube 41, and the two tubes are closed together. From the n-shaped tube 41, one pulls it out and upwardly from the upper frame 4 to separate the insert tubes 44 and the suspension tubes 3. After the two parts are separated, one then pulls out the two suspension tubes 3 from the insert tubes 12 of the base 1. The bending parts 11, at the bottom of the insert tubes 12 of the base 1, are bent 90 degrees and then lie on the two sides of the base 1. After the entire procedure is completed, the portable toilet is ready to be stored in a trunk 7.

It is apparent that although the invention has been described in connection with the embodiment as a portable toilet, it is contemplated that those skilled in the art may make changes to the preferred embodiment without departing from the scope of the invention as defined in the appended claims and can apply the same technique to the vehicle, especially vehicles having a main frame for mounting different mechanism onto it to serve versified functions, and other uses.

I claim:

1. A portable toilet, comprising:

a base including two tubular side members connected transversely by two horizontal tubes, and an insert tube pivotably connected by a bending part to each of the two tubular side members so that each insert tube is capable of approximately a 90 degree displacement relative to a tubular side member;

a bowl having a seat and a container which is integral with the seat, the seat having a bottom with a front, rear, left side and right side, a recessed member disposed at the front and rear of the seat bottom to receive and mate with the two horizontal tubes, a hook disposed at each of the right and left sides of the seat bottom, said hooks adapted to have a waste bag suspended therefrom an upper frame including two generally n-shaped tubes which are pivotably connected to each other at ends thereof by bending parts and are thereby capable of being pivotably disposed by approximately 180 degrees to each other, and one of the generally n-shaped tubes has two spaced-apart bent members extending therefrom and an inert tube extending from each of the two bent members;

two suspension tubes whose diameter is larger than the diameters of the insert tubes of the base and the upper frame, each suspension tube having opposite ends, with one end of each suspension tube mating with an insert tube of the base and an opposite end of each suspension tube mating with an insert tube of the upper frame, thereby connecting the upper frame to the base, a cloth cover extending downward from the upper frame to cover all of said portable toilet; and a trunk for storing the portable toilet in a disassembled condition.

2. A portable toilet as claimed in claim 1, wherein:

each bending part includes a round connecting means at an end of a tube with a concave surface disposed adjacent the round connecting means at the end of the tube, the concave surface having an arc substantially the same as an arc of the round connecting means, the round connecting means and concave surface mating with a round connecting means and concave surface at an end of another, and fastening means for connecting the round connecting means to thereby provide pivotable displacement between the ends of the tubes.

3. A portable toilet as claimed in claim 1, wherein, a zipper is disposed on the cloth cover.

4. A portable toilet as claimed in claim 1, wherein; a waste bag is placed within the container and hooked to the hooks disposed at the bottom on the right and left sides of the seat.

* * * * *